United States Patent [19]

Crowe et al.

[11] Patent Number: 5,371,160

[45] Date of Patent: Dec. 6, 1994

[54] LINEAR POLYVINYLPYRIDINE POLYMERS AND PROCESSES

[75] Inventors: Ernest Crowe, Beech Grove; James G. Keay, Indianapolis; Eric F. V. Scriven, Greenwood, all of Ind.

[73] Assignee: Reilly Industries, Inc., Indianapolis, Ind.

[21] Appl. No.: 43,362

[22] Filed: Apr. 6, 1993

[51] Int. Cl.$^5$ .................. C08F 26/06; C08L 39/04
[52] U.S. Cl. ........................ 526/263; 526/265
[58] Field of Search ................. 526/263, 265

[56] References Cited

U.S. PATENT DOCUMENTS 3,937,764  2/1976  Horikawa et al. .............. 526/265

OTHER PUBLICATIONS

Meverden et al., "Oligomerization of Vinyl Monimers 18. Stereochemistry of Anionic Oligomerization of 4-Vinylpyridine", *J. of Polymer Sci.: Polymer Chem. Ed.*, vol. 23, 159–168 (1985).

Sartoris et al., "Base-Catalyzed Reactions XXXV. The Alkali Metal Catalyzed Reactions of 2- and 4-Picolie with 2- and 4-Vinylpyridine. Disproportionation and Transaralkylation Reactions", *J. of Org. Chem.*, vol. 34, No. 7, pp. 2119–2122 (1969).

Frechet et al., "Poly(Vinyl Pyridie)s: Simple Reactive Polymers with Multiple Applications", *British Polymer J.*, vol. 16, pp. 193–198 (1984).

Reilly Report Promotional Material "Linear Polyvinylpyridines Properties and Applications", Copyright 1983, 1989 Reilly Industries, Inc.

*Primary Examiner*—Joseph L. Schofer
*Assistant Examiner*—Jeffrey T. Smith
*Attorney, Agent, or Firm*—Woodard, Emhardt, Naughton Moriarty & McNett

[57] ABSTRACT

Described are unique polymerization processes for preparing linear polyvinylpyridine polymers as well as unique linear polyvinylpyridine polymer compositions. The processes involve the use of an alkylpyridine anion as an anionic polymerization catalyst and result in linear polyvinylpyridines having alkylpyridine end groups homologous to the pendant pyridines of the polymer. Processes of the invention are particularly advantageous in preparing relatively low molecular weight linear polyvinylpyridines without the need to use large amounts of catalyst to achieve the same.

28 Claims, No Drawings

LINEAR POLYVINYLPYRIDINE POLYMERS AND PROCESSES

BACKGROUND OF THE INVENTION

The present invention resides generally in the field of polymers of vinylpyridines. More particularly, the present invention relates to certain unique linear polyvinylpyridines and expedient methods for their preparation.

Linear polyvinylpyridines and functionalized derivatives and copolymers thereof are useful in a large number of applications. For instance, conductive polymers prepared from linear polyvinylpyridine and molecular iodine have been utilized as cathode materials in small solid-state batteries in which long life under low current strain is required, such as batteries used in implantable cardiac pacemakers. See, U.S. Pat. Nos. 3,660,163 (1972) and 3,773,557 (1973). Quaternary salts of polyvinylpyridines (e.g. poly(1-alkylvinylpyridinium halides)) have proven to be good negative electron beam resists for microlithography. See, K. I. Lee et al., *Proc. SPIE Int. Soc. Opt. Eng.*, 333, 15 (1982).

Polyvinylpyridines have been used extensively in the repographic and lithographic fields because of the combination of properties ranging from adhesive to electrical properties. See, U.S. Pat. Nos. 4,041,204 (1977); 3,942,988 (1976); Ger. Offen. 3,040,047 (1981); Japan KOKAI 76 30,741 (1976); U.S. Pat. No. 4,032,339 (1977); Ger. Offen. 2,701,144 (1977); and Japan KOKAI 75 124,648 (1975). Polyvinylpyridines have also found applications in the film and photographic area. For example, solutions of polyvinylpyridine or their quaternary salts form thin films that protect the image surface of instant film prints. See, U.S. Pat. Nos. 2,874,045 (1959); 2,830,900 (1958); and 3,459,580 (1969).

Polyvinylpyridines are compatible with synthetic and natural polymers such as polyolefins (including polypropylene), polyethylene terephthalate, nylon, and cellulose, and thus field applications in plastics, alloys and blends. Fibers incorporating polyvinylpyridines show excellent dyeing intensity and are color fast [see, e.g. U.S. Pat. No. 3,361,843 (1968)] and polyvinylpyridiniumphosphate imparts permanent fire retardancy to cellulose textiles [see U.S. Pat. No. 2,992,942 (1961)] and thus polyvinylpyridines find uses in the textile industry as well.

Polyvinylpyridines further find utility in the treatment of bleached Kraft paper to increase titanium dioxide retention in pulp slurries, and electroplating applications (in particular quaternary salts), as corrosion inhibitors for metals including iron, aluminium, copper, brass, magnesium and solders, as polymerization inhibitors in Li/TIS$_2$ current-producing electrochemical cells, as emulsion stabilizers and dispersing agents (in particular acid salt and quaternary salt forms), as flocculating agents (particularly acid salt and quaternary ethylhalide forms), in ion exchange membrane preparation and many other applications. These and other uses for linear polyvinylpyridines are reviewed extensively in product literature available from Reilly Industries, Inc., Indianapolis, Ind. U.S.A., entitled "Linear Polyvinylpyridine: Properties and Applications" (1983 and 1989), to which reference can be made for additional information.

As to their preparation, linear polyvinylpyridines have been prepared by various general polymerization techniques. These have included radiation initiated, Ziegler-Natta initiated, free radical initiated and anionic initiated polymerizations. Radiation initiated polymerizations have usually been used for the preparation of graft copolymers. Ziegler-Natta initiated systems usually do not work well for the vinylpyridine systems.

Free radical (addition) polymerizations of vinylpyridines are common in the literature. They are carried out using initiators such as benzoyl peroxide, cummene hydroperoxide and azobis (isobutyronitrile). These polymerizations may be carried out in solution, emulsion or bulk. Free radical initiated polymerizations in alcoholic solvents are the most common for vinylpyridines. However, it is often difficult to control the molecular weight of the vinylpyridine polymers using free radical initiators. Isolation of the vinylpyridine polymers can also be difficult if the polymerization is carried out in a solvent in which the polymer is soluble.

Generally, anionic polymerizations of vinylpyridines are also common in the literature. The most common reported catalyst for anionic polymerizations of vinylpyridines is n-butyllithium. Polymerizations using such reagents are carried out in non-proton donating (nonprotic) solvents such as tetrahydrofuran (THF). Historically, anionic polymerizations of vinylpyridines have been somewhat difficult to control, making it complicated to obtain linear polyvinylpyridines of desired molecular weights, especially at lower molecular weights. One known method for obtaining lower molecular weight polyvinylpyridine homopolymers is to use a large amount of catalyst relative to the amount of vinylpyridine monomer. However, this method is disadvantageous in that the use of large amounts of catalysts is expensive.

Further, when anionic and free radical polymerization catalysts are used to prepare linear polyvinylpyridines, the organic residue of the catalyst ends up as the terminal group of the polyvinylpyridine. Thus, using the conventional anionic and free radical polymerization catalysts of the prior art, the polymer end groups chemically differ from the pendant pyridyl functions of the polymer. This may modify the properties of the polymer and may also interfere with or form undesirable, potentially toxic groups, when the polyvinylpyridine polymer is derivatized to useful non-free base forms.

In light of the background in this area, there is a need for a new polymerization process which enables the efficient preparation of linear polyvinylpyridines, including the preparation of relatively low molecular weight linear polyvinylpyridines without the need for using large amounts of catalyst. Desirably, the polymerization process would provide a linear polyvinylpyridine free from non-homogeneous end groups which may impart undesirable properties to the polymer. The present invention addresses these needs.

SUMMARY OF THE INVENTION

One object of the invention is to provide an efficient anionic polymerization process for preparing linear polyvinylpyridine polymers, which can be effectively used to prepare low molecular weight polymers without the need for using large amounts of catalyst.

Another object of the invention is to provide an anionic polymerization process for preparing linear polyvinylpyridine polymers which avoids the attachment of polymer end groups that chemically differ from the pendant pyridyl functions of the polymer.

Another object of the invention is to provide unique linear polyvinylpyridine polymers with alkylpyridyl end groups.

Another object of the invention is to provide unique functionalized forms of the linear polyvinylpyridine polymers with alkylpyridyl end groups.

These and other objects are achieved by the preferred embodiments of the invention, one of which provides a linear polyvinylpyridine polymer composition having the Formula (I):

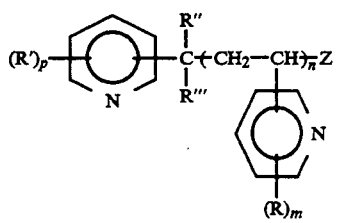

wherein: Z=an ionic group or corresponding protonated group, respectively, having the formula:

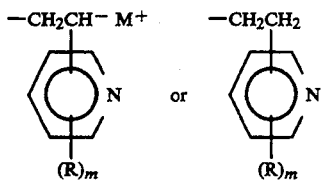

n=about 15 to about 1000 on average;
m=4;
p=4;
M is a metal; and
R, R', R" and R'" may be the same as or different from each other and each independently is —H or lower alkyl.

Another preferred embodiment of the present invention provides a process for preparing a linear polyvinylpyridine composition of Formula (I). The process comprises forming a polymerization reaction mass by charging to a reaction vessel, (i) a lower alkyl-substituted or unsubstituted 2-, 3- or 4-vinylpyridine monomer or a mixture thereof;

(ii) a non-protic solvent; and (ii) about 0.01 to 1 mole per mole of vinylpyridine monomer of an anionic polymerization catalyst having the formula:

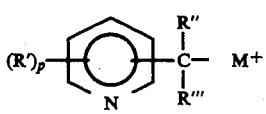

wherein p, M, R', R" and R'" are as defined above. The polymerization reaction mass is maintained so as to polymerize the 2-, 3- or 4-vinylpyridine monomer or mixture thereof and form the polymer of Formula (I) wherein Z is the ionic group. Optionally, the polymerized reaction mass is quenched with a protic substance to form the polymer of Formula (I) wherein Z is the protonated group.

Additional preferred embodiments of the invention provide functionalized forms of the polymer composition of Formula (I) selected from acid salt, N-oxide or quaternary salt forms, and processes for their preparation.

Additional preferred embodiments of the invention as well as its features and advantages will be apparent from the following description.

DESCRIPTION OF THE PREFERRED EMBODIMENT

For the purposes of promoting an understanding of the principles of the invention, reference will now be made to certain embodiments thereof and specific language will be used to describe the same. It will nevertheless be understood that no limitation of the scope of the invention is thereby intended, such alterations, further modifications and applications of the principles of the invention as described herein being contemplated as would normally occur to one skilled in the art to which the invention relates.

As indicated above, the present invention provides unique linear polyvinylpyridine polymer compositions and processes for their preparation. The processes enable effective production of low molecular weight polymers without the need for using substantial amounts of catalyst, and further provide linear polyvinylpyridine polymers having alkylpyridine end groups which are chemically similar to the pendant pyridine groups of the polymer.

Linear polyvinylpyridine polymers of the present invention have the general Formula (I):

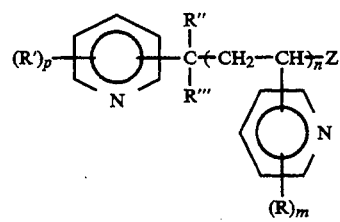

wherein: Z=an ionic group or corresponding protonated group, respectively, having the formula:

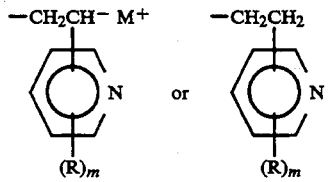

n=about 15 to about 1000 on average;
m=4;
p=4;
M is a metal; and
R, R', R" and R'" may be the same as or different from each other and each independently is —H or lower alkyl.

As used herein, the term "lower alkyl" means a branched or unbranched alkyl group having from 1 to 5 carbon atoms. Representative lower alkyl groups thus include methyl, ethyl, n-propyl, iso-propyl, n-butyl, isobutyl, n-pentyl and isopentyl.

It will be understood that the R groups encompassed by Formula (I) may be the same or may differ from one repeating unit of the polymer to the next. It will also be understood that Formula (I) encompasses not only polymers based upon the polymerization of a single vinylpyridine monomer type, but can also be a copolymer based upon a mixture of vinylpyridines selected from substituted or unsubstituted 2-, 3-, and 4-vinylpyridines.

The polyvinylpyridine polymer compositions of the invention also include functionalized polyvinylpyridine forms, including acid salt forms, N-oxide forms, quaternary salt forms, and the like. The free-base form linear polyvinylpyridine polymers of the invention can be converted to these functionalized forms by conventional techniques, as discussed further below.

More typical values for n in Formula (I) are about 30 to about 1000 on average, and even more typically about 30 to about 500 on average. More preferred polymers are provided wherein each R is H, i.e. polymers prepared from non-substituted 2-, 3-, or 4-vinylpyridine monomers, especially 2- and 4-vinylpyridine polymers; however, as noted above, polymers based upon alkyl-substituted vinylpyridine monomers are also suitable. In this regard, alkyl-substituted monomers are known and are either commercially available or can be prepared by procedures known to the art and literature. See, e.g., Decout, J. L. et al., *J. Prelim. Sci. Prelim. Chem. Ed.*, 18, 2391 (1980). Further preferred polyvinylpyridine polymers are provided where R', R" and R"' are each —H.

As to the anionic polymerization process for preparing the linear vinylpyridine polymers, it is preferred but not necessary that the 2-, 3- or 4-vinylpyridine monomers employed in the invention be of high purity, for example preferably being 95% or more pure. It is also desirable that the vinylpyridine monomer be essentially dry since the presence of water may interfere with the extent of and ability to control the polymerization.

The polymerization is conducted in the presence of an anionic polymerization catalyst having the Formula (II):

wherein R', R" and R"' are as defined above.

The anion can be provided by any suitable source. Typically, the anion will be provided in the form of its metal salt, e.g. by treating the corresponding alkylpyridine with a source of a metal sufficiently strong to form the salt. Preferred such metals include alkali metals and alkaline earth metals, with sodium and lithium being most preferred from work to date. The anion can be added to the reaction vessel in the form of its salt or can be formed in situ. Additionally, where more than one alkyl group is present on the alkylpyridine employed to form the catalyst, poly salts, e.g. di metal salts can be prepared and used. Preferred alkylpyridines for forming the anion include picolines, e.g. alpha-, beta- or gamma-picoline, and lower alkyl-substituted derivatives thereof such as lutidines. The anions employed as polymerization catalysts are generally air-sensitive, and thus appropriate precautions to minimize contact with air are desirably taken.

Processes of the invention are conducted at temperatures sufficient to achieve the desired polymerization of the vinylpyridine monomer in the presence of the selected catalyst. Generally, the temperature of the polymerizations will vary with many factors including the particular catalyst and monomer employed, the rate of contacting the monomer and catalyst, and the like. Typically, however, the temperature of the polymerization will be between about 0° C. and 100° C. Because the polymerizations proceed rapidly without the application of heat, the application of external heat is unnecessary and omitted in preferred reactions. The polymerization is exothermic in nature, with temperatures typically rising from about room temperature to about 40° C. to 50° C. as a result of the exotherm when the vinylpyridine and catalyst are slowly combined.

Broadly speaking, catalytic amounts of the alkylpyridine anion are employed, which are sufficient to polymerize the vinylpyridine monomer to provide the linear polyvinylpyridine of Formula (I). However, in polymerizations of the invention it is highly preferred that the alkylpyridine anion be included in a molar ratio of about 0.01–1:1 with respect to the vinylpyridine monomer. In this regard, an important advantage of the process of the invention is that relatively small amounts of catalyst can be used, while still achieving linear polyvinylpyridine polymers of relatively low molecular weight. In more preferred reactions, the anion catalyst will be present in a molar ratio of about 0.2:1 or less relative to the vinylpyridine monomer.

The polymerizations of the invention can be carried out in any suitable inert solvent that does not interfere with the polymerization. The solvent will be a non-protic solvent, for example an aliphatic or aromatic hydrocarbon solvent or aromatic ether solvent. Suitable solvents thus include petroleum-derived solvents such as naphtha, e.g. varnish makers and painters (VM&P) naphtha, tetrahydrofuran, tetraethylene diamine, hexane, diglyme, monoglyme, dioxane and the like.

The catalyst, reactants and solvents can be combined in any suitable manner to achieve the polymerization. The catalyst can be added to the solvent/monomer mixture, the monomer may be added to the solvent/catalyst mixture, or the catalyst and monomer can be concurrently added to the solvent. It is preferred to slowly combine the catalyst and vinylpyridine monomer to control the exotherm thereby created. The duration of the polymerization reaction will depend upon the specific monomer/catalyst/solvent combination employed and other factors such as the scale of the reaction, but usually will be within the range of up to about 5 hours.

In preferred processes employing a sodium picolinide catalyst, the sodium picolinide is first prepared by contacting and reacting metallic sodium and picoline under heat. The prepared sodium picolinide is then added to the reaction vessel along with the solvent. The vinylpyridine monomer is then added slowly, e.g. dropwise, to the reaction mixture to result in an immediate polymerization reaction.

In preferred processes employing a lithium picolinide catalyst, the lithium picolinide is prepared in situ in the reaction vessel. This can be achieved by first charging the reaction vessel with the solvent and lithium or a source of lithium such as n-butyllithium. The picoline is then added dropwise to the reaction vessel to form the lithium picolinide. The desired vinylpyridine monomer is then slowly added to the reaction vessel whereupon the polymerization reaction proceeds.

Upon completion of the polymerization of the vinylpyridine monomer, the reaction can be quenched for example with a protic agent to terminate the living anions on the ends of the formed polymer chains. Suitable such quenching agents are well-known and include for example alcohols, e.g. lower alcohols such as methanol or ethanol, aqueous media, ammonium salts, $CO_2$, and the like. Processes of the invention can also be used to form block copolymers. Thus, optionally, after the polymerization of the vinylpyridine monomer is complete and prior to quenching, a block copolymer may be formed by adding an amount of a second monomer, e.g. styrene, which can form a polymer block beginning from the living end of the polyvinylpyridine block.

After the quenching step, the polymer can be conventionally isolated. For example, in a heterogeneous polymerization (i.e. when the formed polymer is insoluble in the reaction solvent), the polymer can be filtered from the reaction medium. In a homogeneous polymerization (i.e. the formed polymer is soluble in the reaction solvent), the reacted medium can be contacted by a precipitation solvent in which the polyvinylpyridine is insoluble but in which the remainder of the reaction components are soluble. The polymer can then be filtered from the precipitation solvent. The use of a suitable recovery and isolation technique for the formed polymer is well within the purview of one of ordinary skill in the art.

The polymer is preferably recovered in substantially pure form (i.e. substantially free from other components of the reaction medium such as unreacted monomer, solvent or catalyst residues). Polymer compositions having narrow molecular weight distributions are also favored. Preferred polymer compositions of the invention will have polydispersities (defined as the weight average molecular weight of the polymer divided by the number average molecular weight of the polymer, Mw/Mn) in the range of about 1 to 10 and more preferably in the range of about 1 to 3.

The isolated linear polyvinylpyridines can be conventionally used and derivatized. For example, functionalized linear polyvinylpyridine polymers can readily be obtained. In this regard, as used herein the term functionalized includes both partially and substantially fully functionalized polymers. In most cases, linear polyvinylpyridine polymers are desired in which at least about 10%, more preferably at least about 50% of the pendant pyridine groups, are functionalized. Representative functional forms include acid salts forms, such as those prepared from strong mineral acids such as sulfuric acid or from hydrohalides such as hydrochloric acid. Quaternary salts can also be prepared by reacting the linear polyvinylpyridines with halogenated organics such as alkyl halides, usually $C_1$ to about $C_{10}$ alkyl halides. The linear polyvinylpyridines can be converted to their N-oxide forms by conventional procedures, for instance by reaction with hydrogen peroxide in the presence of acetic acid. See, e.g., the above-cited publication entitled "Linear Polyvinylpyridines: Properties and Applications" by Reilly Industries, Inc. The linear polyvinylpyridine can also form complexes with many metals or metal ligands, such as $Rh_4(CO)_{12}$, $Co_4(CO)_{12}$, $Co_2(CO)_8$ or Ru(II) or Rh(I).

To promote a further understanding of the present invention and its features and advantages, the following specific examples are provided. It is to be understood that these examples are illustrative and not limiting in nature.

EXAMPLES 1-8

Preparations of Linear Polyvinylpyridines

Table 1 sets forth a summary of several runs in which low molecular weight linear polyvinylpyridine polymers were prepared using picolinides as catalysts. Where sodium picolinide was the catalyst, it was prepared by charging metallic sodium (3 g) to 4-picoline (40 ml) and then slowly heating and stirring the nitrogen-purged mixture to about 100° C. for 1 to 2 hours. The resulting brown, air sensitive solution was then added to the polymerization vessel as discussed below using 4-picoline (10 ml) to rinse the picolinide into the polymerization vessel.

To conduct sodium picolinide-catalyzed polymerizations, the 1 L resin pot was fitted with a stirring device and nitrogen purge line. The solvent (600 ml) was then charged to the vessel. Sodium picolinide prepared as discussed above was then charged to the solvent at room temperature to give a heterogeneous mixture. 50 g of a 100 g charge of 4-vinylpyridine were then added dropwise over about 20 minutes. After an exotherm was observed, the remainder of the 4-vinylpyridine was added to the reaction mixture over about 30 minutes. The exotherm (starting at room temperature, approx. 25° C.) reached about 40° C. and gradually fell to room temperature within about 1 hour after monomer addition was completed. The reaction mixture was then stirred at room temperature for an additional 3 to 4 hours. The polymerization was heterogeneous, and started as a brown to purplish solid (the sodium picolinide) and proceeded to a pink solid (the living polymer). For all polymerizations, 2 to 3 ml of methanol were added at the end of the reaction to quench the polymerization. The polymer was then filtered and washed with fresh VM&P naphtha and was dried. The molecular weights of the polymers were determined by gel permeation chromatography using N-dimethylacetamide solvent at 50° C., polystyrene columns and polystyrene standards.

Where a lithium picolinide was used as the catalyst, it was prepared directly in the polymerization vessel. The polymerization vessel was a 1 L stirred and nitrogen purged resin pot and the solvent used was VM&P naphtha (600 ml). The lithium source, e.g. N-butyllithium (0.125 moles as a 2.5M solution), was then charged to the reaction vessel. 4-picoline (12 g) was then added dropwise over about 10 minutes. The reaction was immediate and gave a reddish brown solution. The vinylpyridine monomer was then added slowly to the reaction mixture to result in the polymerization.

In Table 1 below, VM&P=VM&P naphtha and "ND"=not determined. The metal sources for preparing the picolinide anions are given in parentheses under the inicated catalysts.

TABLE 1

| Example | Catalyst | Solvent | MW | Yield (g) |
|---|---|---|---|---|
| 1 | 0.1 mole Na Picolinide (from sodium metal) | VM & P | 12535 | ~100 |
| 2 | 0.13 mole Na Picolinide (from sodium metal) | VM & P | 4744 | 75 |
| 3 | 0.13 mole Na Picolinide (from sodium metal) | VM & P | 3898 | 92.5 |
| 4 | 0.1 mole Na Picolinide (from sodium amide) | VM & P | 6103 | 24 |
| 5 | 0.125 mole Li Picolinide (from n-butyllithium) | VM & P | ND | 54 |
| 6 | 0.13 mole NA Picolinide | Heptane | 36596 | ~100 |
| 7 | 0.3 mole Na Picolinide | Heptane | 37054 | 74 |
| 8 | 0.113 mole Na Picolinide | Heptane | 14833 | 94 |

EXAMPLES 9-19

Preparations of Functionalized Linear Polyvinylpyridines

The functionalized linear polyvinylpyridines set forth in Table 2 can be prepared by reacting the free base form polyvinylpyridines of the indicated prior Examples with the indicated reagents.

TABLE 2

| Example | Polymer | Agent | Functional Form |
|---|---|---|---|
| 9 | Ex. 1 | Acetic Acid/ $H_2O_2$ | N-oxide |
| 10 | Ex. 3 | Acetic Acid/ $H_2O_2$ | N-oxide |
| 11 | Ex. 7 | Acetic Acid/ $H_2O_2$ | N-oxide |
| 12 | Ex. 1 | HCl | HCl:Acid Salt |
| 13 | Ex. 3 | HCl | HCl:Acid Salt |
| 14 | Ex. 7 | $H_2SO_4$ | $H_2SO_4$:Acid Salt |
| 15 | Ex. 1 | Methyl Iodide | Quaternary Salt |
| 16 | Ex. 3 | Methyl Iodide | Quaternary Salt |
| 17 | Ex. 7 | Methyl Iodide | Quaternary Salt |
| 18 | Ex. 3 | Ethyl Iodide | Quaternary Salt |
| 19 | Ex. 7 | Ethyl Iodide | Quaternary Salt |

All publications cited herein are indicative of the level of ordinary skill in the art, and each is hereby incorporated by reference in its entirety as if individually incorporated by reference and fully set forth.

While the invention has been described in detail in the foregoing description, the same is to be considered as illustrative and not restrictive in character, it being understood that only the preferred embodiments have been described and that all changes and modifications that come within the spirit of the invention are desired to be protected.

What is claimed is:

1. A linear polyvinylpyridine polymer composition having the formula (I):

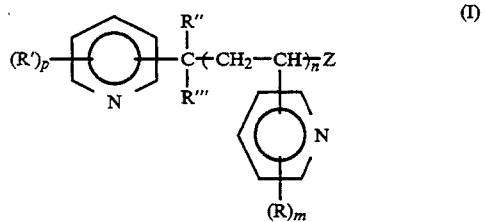

wherein: Z=an ionic group or corresponding protonated group, respectively, having the formula:

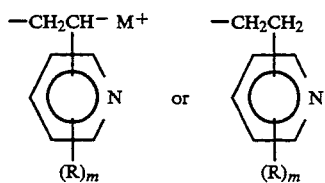

n=about 15 to about 1000 on average;
m=4;
p=4;
M is a metal; and
R, R', R" and R'" may be the same as or different from each other and each independently is —H or lower alkyl.

2. The polyvinylpyridine polymer composition of claim 1 wherein Z is said ionic group.

3. The polyvinylpyridine polymer composition of claim 1, wherein Z is said protonated group.

4. The polyvinylpyridine polymer composition of claim 3, wherein each R is —H.

5. The polyvinylpyridine polymer composition of claim 4, wherein each R" and R'" is —H.

6. The polyvinylpyridine polymer composition of claim 1, wherein n=about 30 to about 1000 on average.

7. The polyvinylpyridine polymer composition of claim 5, wherein n=about 30 to about 1000 on average.

8. The polyvinylpyridine polymer composition of claim 7, wherein said linear polyvinylpyridine is linear 2-vinylpyridine polymer, linear 4-vinylpyridine, or linear 2- and 4-vinylpyridine copolymer.

9. The polyvinylpyridine polymer composition of claim 8, wherein said linear polyvinylpyridine is linear 2-vinylpyridine polymer.

10. The polyvinylpyridine polymer composition of claim 8, wherein said linear polyvinylpyridine is linear 4-vinylpyridine polymer.

11. A functionalized linear polyvinylpyridine composition, comprising an acid salt, N-oxide or quaternary salt form of a linear polyvinylpyridine polymer composition according to claim 3.

12. The functionalized linear polyvinylpyridine composition of claim 11, which is an acid salt form.

13. The functionalized linear polyvinylpyridine composition of claim 11, which is an N-oxide form.

14. The functionalized linear polyvinylpyridine composition of claim 11, which is a quaternary salt form.

15. The functionalized linear polyvinylpyridine composition of claim 12, wherein the acid salt form is a hydrohalide or sulfuric acid salt form.

16. The functionalized linear polyvinylpyridine composition of claim 14, wherein the quaternary salt form is an alkyl halide quaternary salt form.

17. The functionalized linear polyvinylpyridine composition of claim 11, wherein said linear polyvinylpyridine composition is linear 2-vinylpyridine polymer, linear 4-vinylpyridine polymer, or linear 2- and 4-vinylpyridine copolymer.

18. The functionalized linear polyvinylpyridine composition of claim 17, wherein said linear polyvinylpyridine composition is linear 2-vinylpyridine polymer.

19. The functionalized linear polyvinylpyridine composition of claim 17, wherein said linear polyvinylpyridine composition is linear 4-vinylpyridine polymer.

20. The functionalized linear polyvinylpyridine composition of claim 18, wherein n=about 30 to about 500 on average.

21. The functionalized linear polyvinylpyridine composition of claim 19, wherein n=about 30 to about 500 on average.

22. A process for preparing a linear polyvinylpyridine polymer composition of Formula (I):

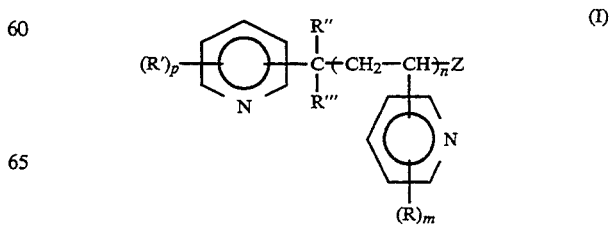

wherein: Z=an ionic group or corresponding protonated group, respectively, having the formula:

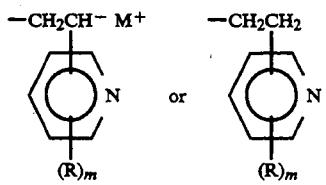

n=about 15 to about 1000 on average;
m=4;
p=4;
M is a metal; and
R, R', R" and R'" may be the same as or different from each other and each independently is —H or lower alkyl;
said process comprising:
 forming a polymerization reaction mass by charging to a reaction vessel,
 (i) a lower alkyl-substituted or unsubstituted 2-, 3- or 4-vinylpyridine monomer or a mixture thereof;
 (ii) a non-protic solvent; and
 (ii) about 0.01 to 1 mole per mole of vinylpyridine monomer of an anionic polymerization catalyst having the formula (II):

 (II)

wherein p, M, R', R" and R'" are as defined above;
maintaining said polymerization reaction mass so as to polymerize said 2-, 3- or 4-vinylpyridine monomer or mixture thereof and form the polymer of Formula (I) wherein Z is said ionic group; and
optionally quenching said polymerized reaction mass with a protic substance to form said polymer of Formula (I) wherein Z is said protonated group.

23. The process of claim 22, wherein each R, R', R" and R'" is —H.

24. The process of claim 23 wherein n=about 30 to about 1000 on average.

25. A process for preparing functionalized form of a linear polyvinylpyridine polymer composition of the formula:

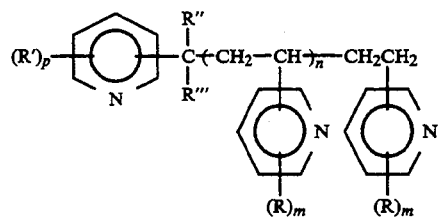

wherein: n=about 15 to about 1000 on average;
m=4;
p=4; and
R, R', R" and R'" may be the same as or different from each other and each independently is —H or lower alkyl;
said process comprising:
 forming a polymerization reaction mass by charging to a reaction vessel,
 (i) a lower alkyl-substituted or unsubstituted 2-, 3- or 4-vinylpyridine monomer or a mixture thereof;
 (ii) a non-protic solvent; and
 (ii) about 0.01 to 1 mole per mole of vinylpyridine monomer of an anionic polymerization catalyst having the formula:

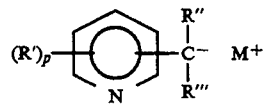 (II)

wherein M is a metal and p, M, R', R" and R'" are as defined above;
maintaining said polymerization reaction mass so as to polymerize said 2-, 3- or 4-vinylpyridine monomer or mixture thereof;
quenching the polymerized reaction mass with a protic substance to form said polymer; and
converting said polymer to a functionalized form thereof selected from an acid salt, N-oxide or quaternary salt form.

26. The process of claim 25, wherein said polymer is converted to an acid salt form.

27. The process of claim 25, wherein said polymer is converted to an N-oxide form.

28. The process of claim 25 wherein said polymer is converted to a quaternary salt form.

* * * * *

UNITED STATES PATENT AND TRADEMARK OFFICE
CERTIFICATE OF CORRECTION

PATENT NO. : 5,371,160
DATED : December 6, 1994
INVENTOR(S) : Ernest Crowe, James G. Keay and Eric F.V. Scriven It is certified that error appears in the above-indentified patent and that said Letters Patent is hereby corrected as shown below:

At Column 1, line 39, please delete "field" and insert in lieu thereof --find--.

At Column 11, line 30, i.e. formula "II", the structure should be corrected to include bonds shown between C and R'' and C and R''', and thus appear as follows:

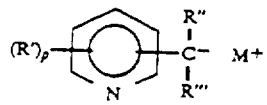

Signed and Sealed this

Twenty-fourth Day of October, 1995

Attest:

BRUCE LEHMAN

*Attesting Officer*     *Commissioner of Patents and Trademarks*